United States Patent
Carruthers et al.

(10) Patent No.: US 6,996,136 B1
(45) Date of Patent: Feb. 7, 2006

(54) ULTRASHORT-PULSE FIBER LASER WITH A DISPERSION-MANAGED CAVITY

(75) Inventors: Thomas F. Carruthers, Laurel, MD (US); Irl N. Duling, III, Round Hill, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/566,236

(22) Filed: May 5, 2000

(51) Int. Cl.
*H01S 3/30* (2006.01)

(52) U.S. Cl. .............................. 372/6; 372/18; 372/29; 372/106

(58) Field of Classification Search .................... 372/6, 372/27, 38.02, 18, 29, 106
See application file for complete search history.

(56) References Cited

U.S. PATENT DOCUMENTS

| | | | | |
|---|---|---|---|---|
| 5,303,314 | A | | 4/1994 | Duling, III et al. ........... 385/11 |
| 5,574,739 | A | * | 11/1996 | Carruthers et al. ........... 372/27 |
| 5,617,434 | A | | 4/1997 | Tamura et al. ................ 372/6 |
| 5,646,774 | A | | 7/1997 | Takara et al. ................ 359/340 |
| 5,999,292 | A | | 12/1999 | Dennis et al. ............... 359/138 |
| H1926 | H | * | 12/2000 | Carruthers et al. ............ 372/6 |

OTHER PUBLICATIONS

Carruthers et al.; Dispersion Measurement in a Harmonically Mode—Locked Fiber Soliton Laser; Opt. LTRS, vol. 25, No. 3, pp. 153-155; Feb. 2000.
Clark et al.; Phase Noise Measurements of Ultrastable 10GHz Harmonically Modelocked Fibre Laser; Elect Ltrs; vol. 35, No. 9, pp 720-721; Apr. 1999.
Smith et al.; Enhanced Power Solitons in Optical Fibres with Periodic Dispersion Management; Elect. Ltrs; vol. 32, No. 1, pp. 54-55; Jan. 1996.
Nakazawa et al.; Supermode noise suppression in a harmonically modelocked fibre laser by selfphase modulation and spectral filtering; Elect. Lett., 1996, vol. 32 No. 5; pp. 461-463.
Carruthers et al.; Enhanced Stability of a Dispersion-Managed, Harmonicallty Mode-Locked Fiber Laser; CLEO '99; pp. 101-102; May 1999.
Horowitz et al.; Dispersion Management in an Actively Modelocked Fiber Laser with KERR Nonlinearity, CLEO '99; pp. 102-103; May 1999.
Bakhshi et al.; Harmonically Mode-Locked, Polarization—Maintaining, and Dispersion—Managed Erbium Fiber Ring Laser, with Variable Output Coupling; CLEO '98; pp. 497-498; May '98.

(Continued)

*Primary Examiner*—Don Wong
*Assistant Examiner*—Cornelius H Jackson
(74) *Attorney, Agent, or Firm*—John J. Karasek; Sally A. Ferrett

(57) ABSTRACT

The ultrashort fiber laser with a dispersion-managed cavity. The laser is an actively mode-locked sigma laser, typically locked at a repetition rate of 10 GHz, driven by an external frequency source and actively length stabilized, and nearly 10,000 pulses circulate within the laser cavity. A Mach-Zehnder modulator is placed in a loop of polarization-maintaining (PM) fiber. The polarization state of light injected into the non-PM branch evolves in a random manner but is transformed into an orthogonal state by a Faraday mirror; linearly polarized light injected into the branch by a polarizing beamsplitter returns to the beamsplitter also linearly polarized but rotated by 90°. The cavity of the laser is composed of several fibers. The average dispersion $D_{av}$ is anomalous and is approximately equal to 0.1 ps/(nm·km).

13 Claims, 15 Drawing Sheets

OTHER PUBLICATIONS

Ellis et al.; 1.6PS Pulse Generation at 40GHz in Phaselocked Ring Laser Incorporating Highly Nonlinear Fibre for Appucation to 160Gbit/s OTDM Networks; Elec. Ltrs; vol. 35, No. 8, pp. —; Apr. '98.

Horowitz et al.; Pulse Dropout in Harmonically Mode-Locked Fiber Lasers; IEEE Photonics Tech. Ltrs; vol. XX, No. X; pp. —; Oct. '99 .

Carruthers et al.; A Dispersion-Managed, Harmonically Mode-Locked Fiber Soliton Laser; LEDS '99, pp. 774-775; Nov. '99.

Bakhshi et al.; A Polarization-Maintaining and Dispersion-Managed 10Ghz Mode-Locked Erbium Fiber Ring Laser Providing Both Sech- and Gaussian-Shaped Pulses; Opt. Fib. Tech.; No. 4; pp. 293-303; '98.

Grigoryon et al.; Dispersion-Managed Soliton Dynamics; Opt. Ltrs; vol. 22, No. 21; pp. 1609-1611; Nov. '97.

Nakazawa et al.; 10 GHz, 2 PS Regeneratively and Harmonically FM Mode-Locked Erbium Fibre Ring Laser; Elect. Ltrs.; vol. 32, No. 14; pp. —.

Smith et al; Enhanced Power Solitons in Optical Fibres with Periodic Dispersion Management; Elect. Ltrs. vol. 32, No. 1; pp. 54-55; Jan. '96.

Carruthers et al.; 10-Ghz, 1.3-PS Erbium Fiber Laser Employing Soliton Pulse Shortening; Optics Ltrs.; vol. 21; No. 23; pp. 1927-1929, Dec. '96.

Carruthers et al.; Active-Passive Modelocking in a Single-Polarization Erbium Fibre Laser; Elect. Ltrs; vol. 30; No. 13; pp. 1051-1052, Jun. '94.

Carruthers, T.F., "Enhanced stability of a dispersion-managed, harmonically mode-locked fiber laser" Lasers and Electro-Optics, 1999, CLEO '99, May 23-28, 1999, pp. 101-102.

Horowitz, M., "Dispersion management in an actively modelocked fiber laser with Kerr nonlinearity" Lasers and Electro-Optics, 1999, CLEO '99, May 23-28, 1999, pp. 102-103.

Horowitz, M., "Theoretical and Experimental Study of Harmonically Modelocked Fiber Lasers for Optical Communication Systems", J. Lightwave Tech., V18, No. 11, Nov. 2000, pp. 1565-1574.

Smith, N., Soliton Transmission Using Periodic Dispersion Compensation Lightwave Tech., V 15, No. 10, Oct. 1997, pp. 1808-1822.

Dennis, M., "Long Span Repeaterless Transmission Using Adiabatic Solitons" IEEE Photonics Technology Letters, vol. 11, No. 4, Apr. 1999, pp.: 478-480.

Haus, H.A., "Additive-Pulse Modelocking in Fiber Lasers" IEEE Journal of Quantum Electronics, vol. 30, No. 1, Jan. 1994, pp.: 200-208.

Margalit, M., "Harmonic Mode-Locking Using Regenerative Phase Modulation" IEEE Photonics Technology Letters, vol. 10, No. 3, Mar. 1998, pp.: 337-339.

Matsumoto, M., "Stretched-Pulse Optical Fiber Communications" IEEE Photonics Technology Letters, vol. 9, No. 6, June 1997, pp.: 785-787.

Mollenauer, Linn F., "Long-Distance Soliton Propagation Using Lumped Amplifiers and Dispersion Shifted Fiber" Lightwave Tech. vol. 9 No. 2, Feb. 1991 194-197.

Grigoryan, V.S., "Dispersion-managed soliton dynamics" Optics Letters, vol. 22, No. 21, Nov. 1, 1997, pp.: 1609-1611.

Carruthers, T.F., "Passive Laser mode locking with an antiresonant nonlinear mirror" Optics Letters, vol. 15, No. 14, Jul. 15, 1990, pp. 804-806.

Carruthers, T., "10-GHz, 1.3-ps erbium fiber laser employing soliton pulse shortening" Optics Letters, vol. 21, No. 23, Dec. 1, 1996, pp.: 1927-1929.

Carruthers, T., "Dispersion management in a harmonically mode-locked fiber soliton laser" Optics Letters, vol. 25, No. 3, Feb. 1, 2000, pp.: 153-155.

Tamura, K., "77-fs pulse generation from a stretched-pulse mode-locked all fiber ring laser" Optics Letters, vol. 18, No. 13, Jul. 1, 1993, pp.: 1080-1082.

Forysiak, W., "Reduction of Gordon-Haus Jitter by Post-Transmission Dispersion Compensation" Electronics Letters, Jun. 24, 1993, vol. 29, No. 13, pp.: 1225-1226.

Smith, N.J., "Enhanced power solitons in optical fibres with periodic dispersion management" Electronics Letters, Jan. 4, 1996, vol. 32, No. 1, pp.: 54-55.

Shan, X., "Stabilising Er Fibre Soliton Laser with Pulse Phase Locking" Electronics Letters, Jan 16, 1992, vol. 28, No. 2, pp.: 182-184.

Carruthers, T.F., "Active-passive modelocking in a single-polarisation erbium fibre laser" Electronics Letters, Jun. 23, 1994, vol. 30, No. 13, pp.: 1051-1053.

Bakhshi, B., " 10GHz modelocked, dispersion-managed and polarisation-maintaining erblum fibre ring laser with variable output coupling" Electr. Lett., 1998, V.34, No. 9, pp. 884-885.

Clark, T.R., "Phase noise measurements of ultrastable 10GHz harmonically modelocked fibre laser" Electronics Letters, Apr. 29, 1999, vol. 35, No. 9, pp.: 720-721.

Nakazawa, M., "Supermode noise suppression in a harmonically modelocke fibre laser by selphase modulation and spectral filtering" Electr. Lett., 1996, V.32, No.5, pp. 461-463.

Bakhshi, B., "A Polarization-Maintaining and Dispersion-Managed 10 GHz Mode-Locked Erbium Fiber Ring Laser" Optical Fiber Tech. 4, 293-303 (1998).

Carruthers, T.F., "10GHz, single-polarization, actively mode-locked picosecond erbium fiber laser" OFC '96 Technical Digest - Conf. Opt. Fiber Comm., Feb. 25-Mar. 1, 1996, pp. 7-8.

Fatemi, F.K., "Frequency comb linewidth of an actively mode-locked fiber Laser" Optics Letters, 29 (9), pp. 944-946 (2004).

Carruthers, T.F., "A Dispersion-Managed Harmonically Mode-Locked Fiber Soliton Laser", LEOS '99, Nov. 10-11, 1999, IEEE, pp. 774-775.

Clark, T.R., "Sub- 10 Femtosecond timing jitter of a 10-GHz harmonically mode-locked fiber laser" OFC/IOOC '99. Digest, vol. Suppl., Feb. 21-26, 1999, pp. PE24/1-PD24/3 Sup.

Ellis, A.D., "1.6ps pulse generation at 40GHz in phaselocked ring laser incorporating highly nonlinear fibre" Electr. Lett., 1999, vol. 35, No. 8, pp. 645-646.

Horowitz, M., "Pulse Dropout in Harmonically Mode-Locked Fiber Lasers" IEEE Photonics Technology Letters, vol. 12, No. 3, Mar. 2000, pp.: 266-268.

* cited by examiner

I. $P_{out}/P_{max} = 0.047$

IIa. $P_{out}/P_{max} = 0.064$

IIb. $P_{out}/P_{max} = 0.27$

IIIa. $P_{out}/P_{max} = 0.34$

IIIb. $P_{out}/P_{max} = 1.00$

ULTRASHORT-PULSE FIBER LASER WITH A DISPERSION-MANAGED CAVITY

BACKGROUND OF THE INVENTION

1. Field of the Invention

This invention in general refers to dispersion management within a laser cavity and more particularly to a laser apparatus where dispersion management is used to enhance the performance of the laser by reducing the timing jitter of the pulses produced by the laser and by reducing the occurrence of pulse dropouts or multiple pulse production.

2. Description of the Related Art

Dispersion management within a laser cavity allows a fiber laser to produce optical pulses of lower amplitude and phase noise and with greater immunity to pulse dropouts than is otherwise possible. These features are of great importance to lasers used as sources in telecommunications applications, as research instruments, or in optical-to-digital conversion and analysis application.

Dispersion management is a concept usually encountered only in optical soliton fiber transmission applications. In that field, it has been found that the use of lengths of at least two types of fibers with different chromatic dispersions, usually of differing signs, but with a (usually small) net anomalous dispersion, yields a transmission medium with distinct advantages over one with a uniform dispersion: i) the optical energy of the solitons carrying information is greater than those in a uniform-dispersion fiber with the net dispersion, yielding a greater signal-to-noise (S/N) ratio of the signal; ii) the timing jitter in the system is lower; iii) the pulses tend to have a Gaussian temporal profile, reducing pulse-to-pulse interactions; iv) nonlinear pulse interactions such as four-wave mixing are strongly reduced because of the strong local dispersion. The strength of dispersion management is usually expressed as a unitless parameter $$\gamma = 2\Sigma_n |\beta''_n l_n|/\tau^2$$

where $\beta''_n$ and $l_n$ are the dispersion and length respectively, of fiber segment n, and $\tau$ is the pulse duration.

Dispersion-managed solitons have two salient properties for the purposes herein: their energy is greater than that of an equivalent uniform-dispersion soliton, and their pulse duration changes much less with a change in pulse energy than does an equivalent uniform-dispersion soliton.

In an actively harmonically mode-locked soliton laser four regimes of operation are expected to be seen as the amount of energy per pulse is varied: (i) At the lowest energies, the laser cannot form solitons, and a very noisy output of long-duration pulses is evident. (ii) At somewhat higher energies, there is not enough power available for a full train of solitons, so the laser can form either a train of long-duration pulses or an occasional soliton. The laser loss is higher for long-duration pulses, since they would be clipped by the finite duration of the amplitude mode-locking time window. Therefore a combination of solitons and dropouts is observed. (iii) At higher frequencies, the laser can produce an uninterrupted stream of solitons. In this regime, the pulse duration becomes briefer as the pulse energy increases. (iv) At the highest energies, pulses are prevented from becoming more brief by the fact that energy is lost when they become so brief and their bandwidth consequently becomes so large that the pulses are clipped spectrally by the finite gain bandwidth (or the bandwidth of an intracavity bandpass filter). Then multiple pulses begin to appear in each time slot.

The desirable operating regime from a telecommunications standpoint is (iii), in which an uninterrupted stream of pulses is generated. The maximum and minimum pulse widths which define the boundaries of this regime are determined by the details of the laser parameters.

In a laser of uniform dispersion, the pulse energy range over which the laser operates in the stable regime can be as small as 30%. One characteristic of a dispersion-managed laser is that the pulse duration decreases by comparatively little as the pulse energy increases; as a consequence, the laser can operate in the stable regime over a pulse energy range of as much as a factor of 100.

BRIEF SUMMARY OF THE INVENTION

The object of this invention is to provide a dispersion-managed soliton laser exhibiting a greater immunity to pulse dropouts than an equivalent uniform-dispersion soliton laser along with lower amplitude noise and timing jitter.

Another objective of this invention is to produce a soliton fiber laser that can produce pulses with adjustable temporal and spectral intensity profiles and durations to suit particular applications.

These and other objectives are attained by ultrashort fiber laser with a dispersion-managed cavity. The laser is an actively mode-locked sigma laser, typically locked at a repetition rate of 10 GHz, driven by an external frequency source and actively length stabilized, and nearly 10,000 pulses circulate within the laser cavity. A Mach-Zehnder modulator is placed in a loop of polarization-maintaining (PM) fiber. The polarization state of light injected into the non-PM branch evolves in a random manner but is transformed into an orthogonal state by a Faraday mirror; linearly polarized light injected into the branch by a polarizing beamsplitter returns to the beamsplitter also linearly polarized but rotated by 90°. The cavity of the laser is composed of several fibers. The average dispersion $D_{av}$ is anomalous and is approximately equal to 2 ps/(nm·km). The measured noise in the output of the laser is very low, the rms amplitude noise is less than 0.035% and the rms timing jitter is less than 10 femtoseconds over a frequency range of 100 Hz to 1 MHz.

BRIEF DESCRIPTION OF THE DRAWINGS

FIG. 2c shows a regeneratively-locked laser with length-stabilization.

DETAILED DESCRIPTION OF THE INVENTION

Figure 1A:
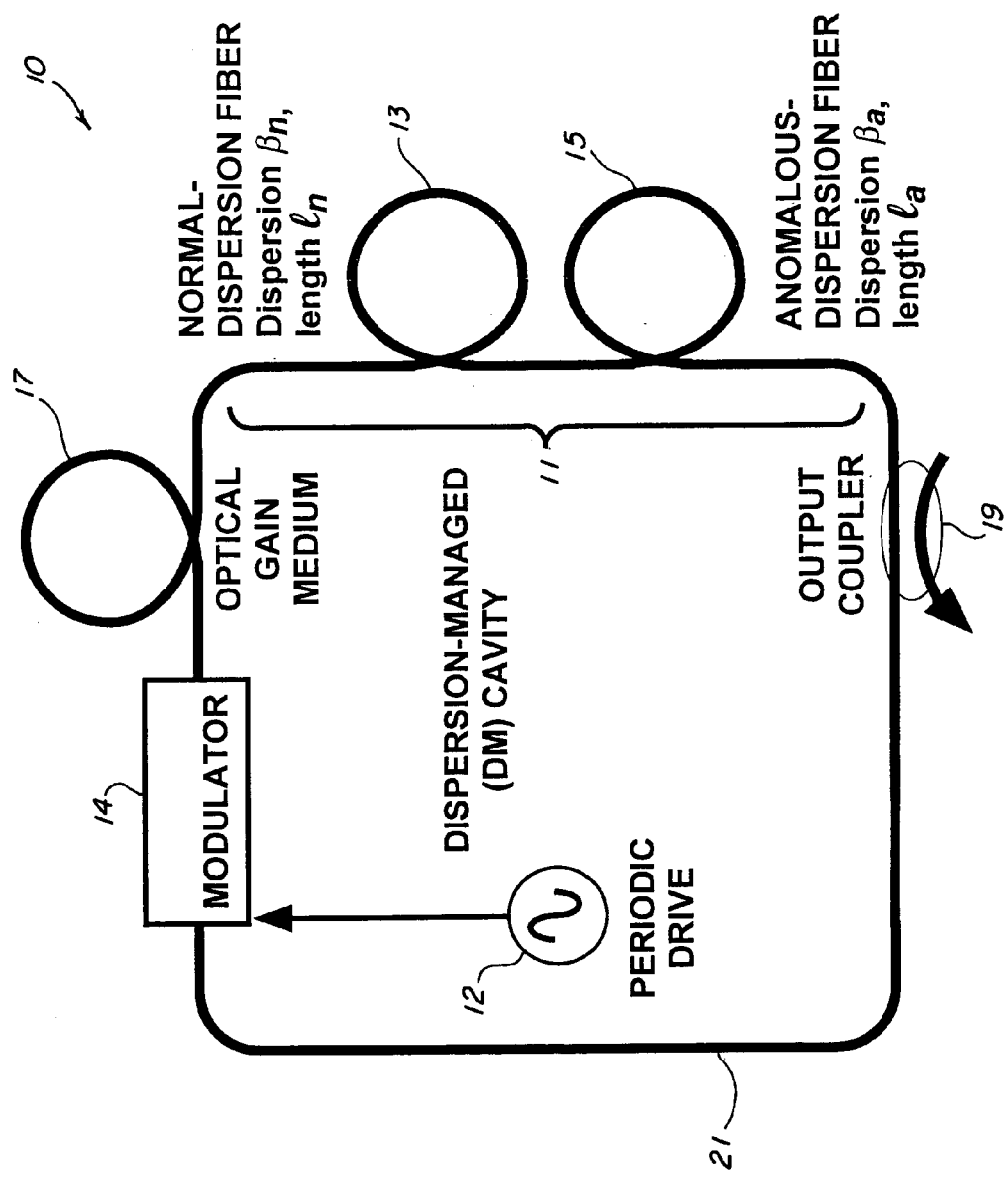
FIG. 1a shows a basic schematic of a dispersion-managed, actively mode-locked, all polarization-maintaining fiber laser.

In a first preferred embodiment a basic mode-locked pulse dispersion-managed soliton sigma laser 10, as shown in FIG. 1a, comprises a dispersion-managed cavity 11 having at normal dispersion medium 13 and a anomalous-dispersion medium 15. The normal dispersion medium 13 and the anomalous-dispersion medium 15 has opposite signs of chromatic dispersion for stretching the pulse width and lower the peak power of the optical pulse. An optical signal within a loop 21 is modulated by applying a signal from a periodic drive 12 an optical modulator 14, and amplified by an optical amplifier 17. An optical coupler 19 removes the optical signal from the loop and applies it to other processing elements (not shown). The periodic drive 12 may be an external frequency source such as a master clock (synthesizer). The loop 21 is, preferably, a polarization-maintaining optical fiber.

Figure 1B:
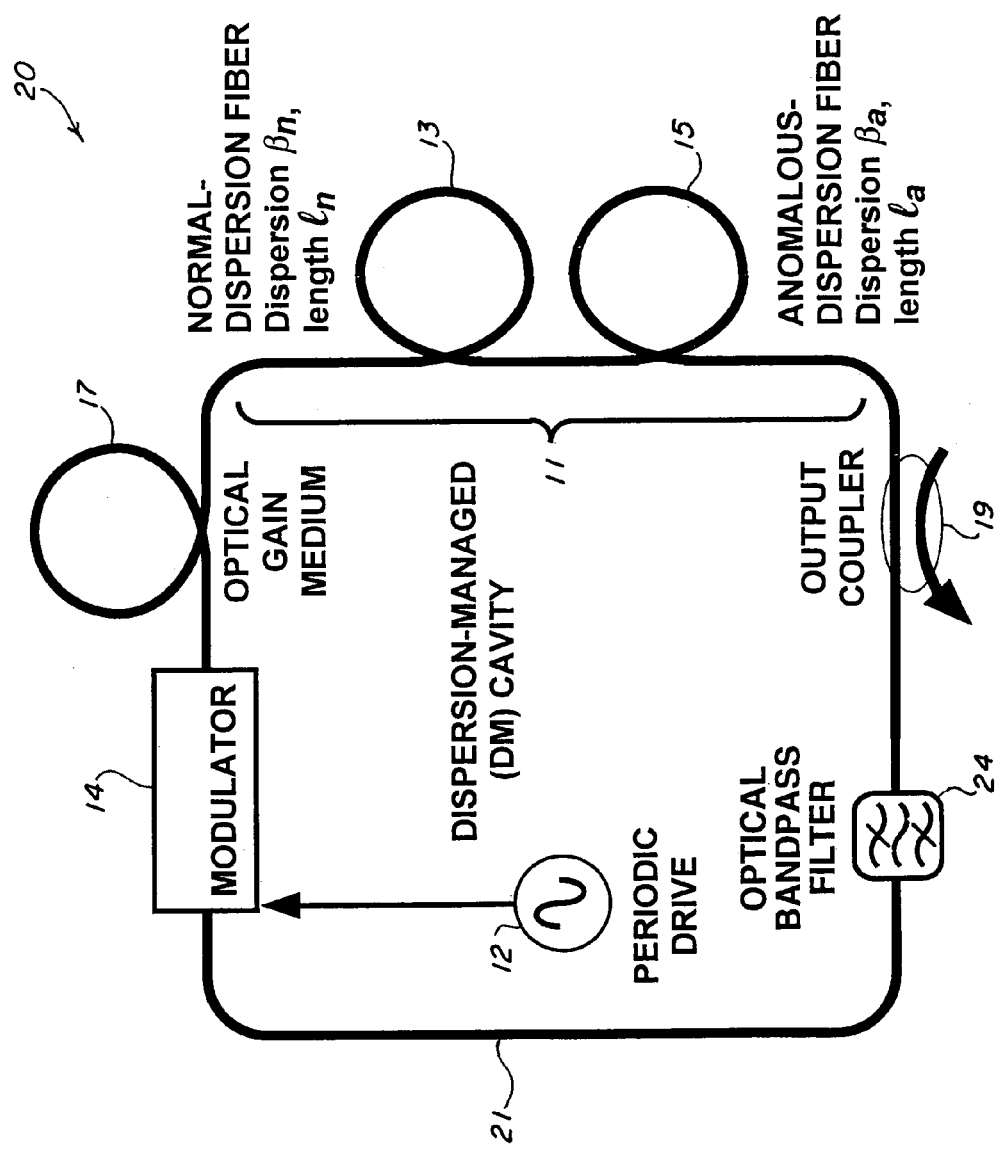
FIG. 1b shows a basic schematic of a dispersion-managed, actively mode-locked, all polarization-maintaining fiber laser containing an optical bandpass filter.

In a second embodiment of a basic dispersion-managed, actively mode-locked, all polarization-maintaining fiber laser 20, as shown in FIG. 1b, the same optical circuit is utilized, as that shown in FIG. 1a, however an optical tunable or variable bandpass filter 24 is inserted into the loop 21 to pass a select band of optical frequencies.

Figure 1C:
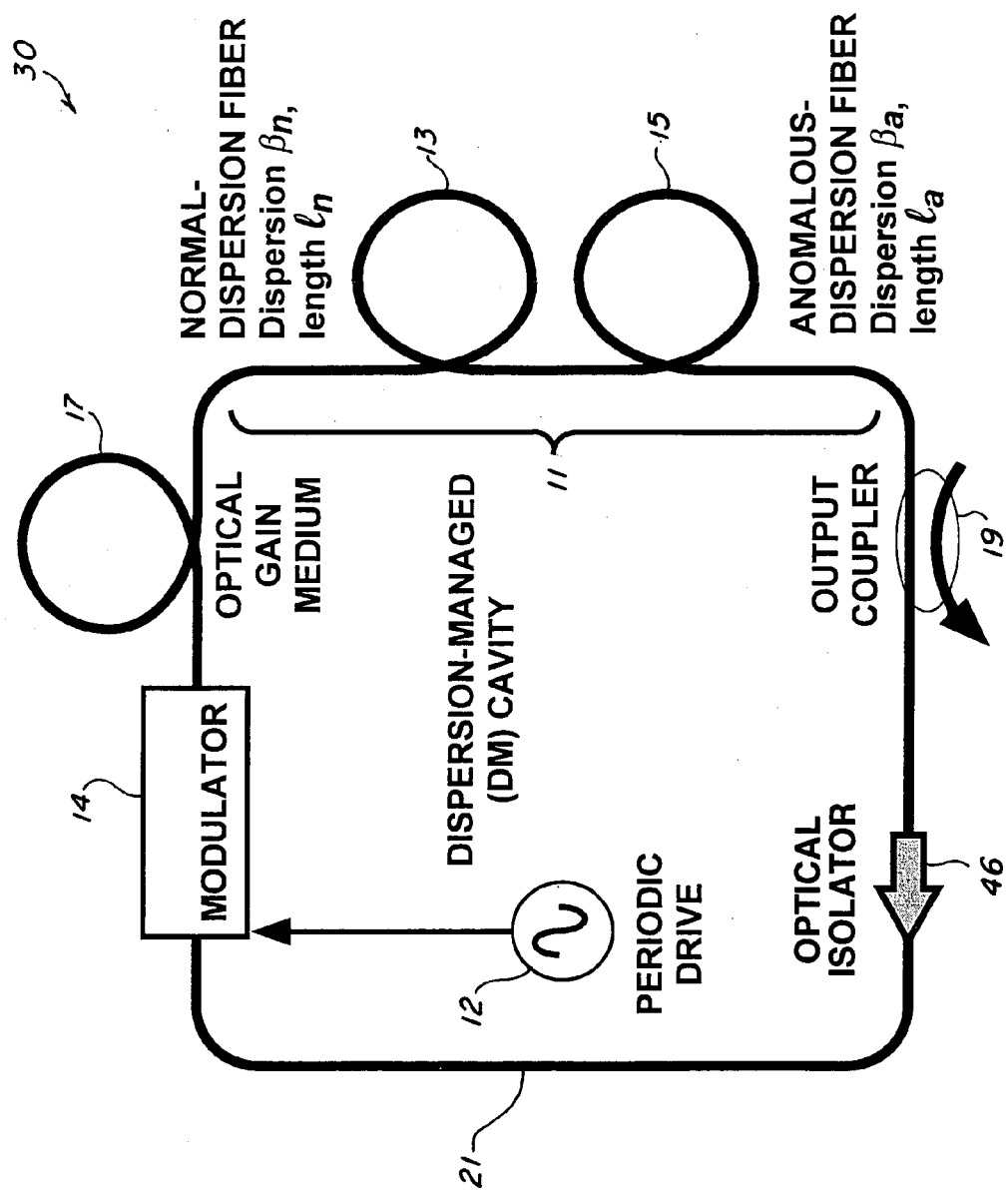
FIG. 1c shows a basic schematic of a dispersion-managed, actively mode-locked, all polarization-maintaining fiber laser containing an optical isolator.

In another embodiment of a basic dispersion-managed, actively mode-locked, all polarization-maintaining fiber laser 30, as shown in FIG. 1c, the same optical circuit is utilized, as that shown in FIG. 1a, however an optical isolator 46 is inserted into the loop 21 to ensure unidirectional flow of optical light.

Figure 1D:
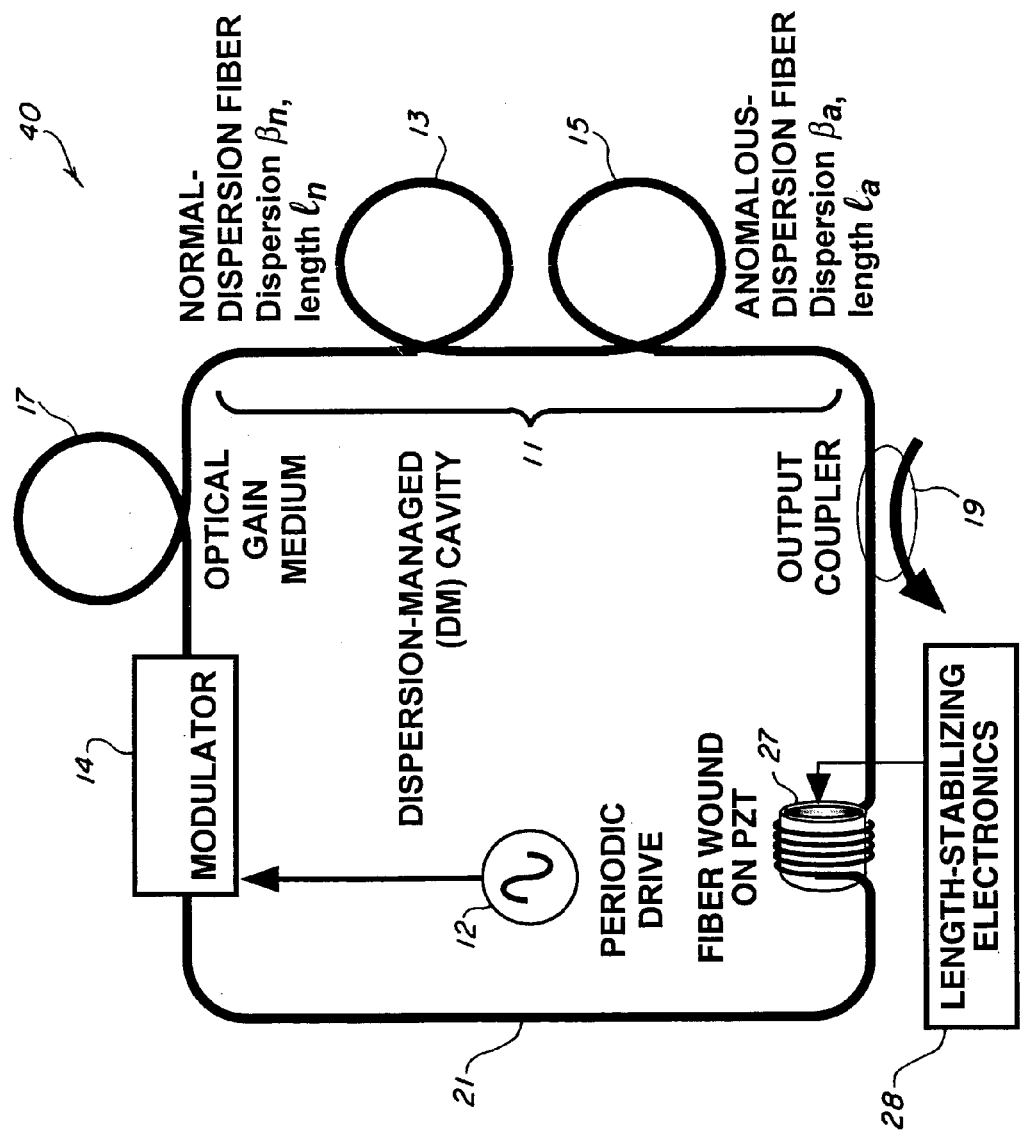
FIG. 1d shows a basic schematic of a dispersion-managed, actively mode-locked, all polarization-maintaining fiber laser containing a fiber-wound PZT cylinder-based length-stabilizing system.

In another embodiment of a basic dispersion-managed, actively mode-locked, all polarization-maintaining fiber laser 40, as shown in FIG. 1d, the same optical circuit is utilized, as that shown in FIG. 1a, however an optical fiber wound on a PZT cylinder 27 with length-stabilizing electronics 28 controls the length of the optical fiber laser cavity.

Figure 1E:
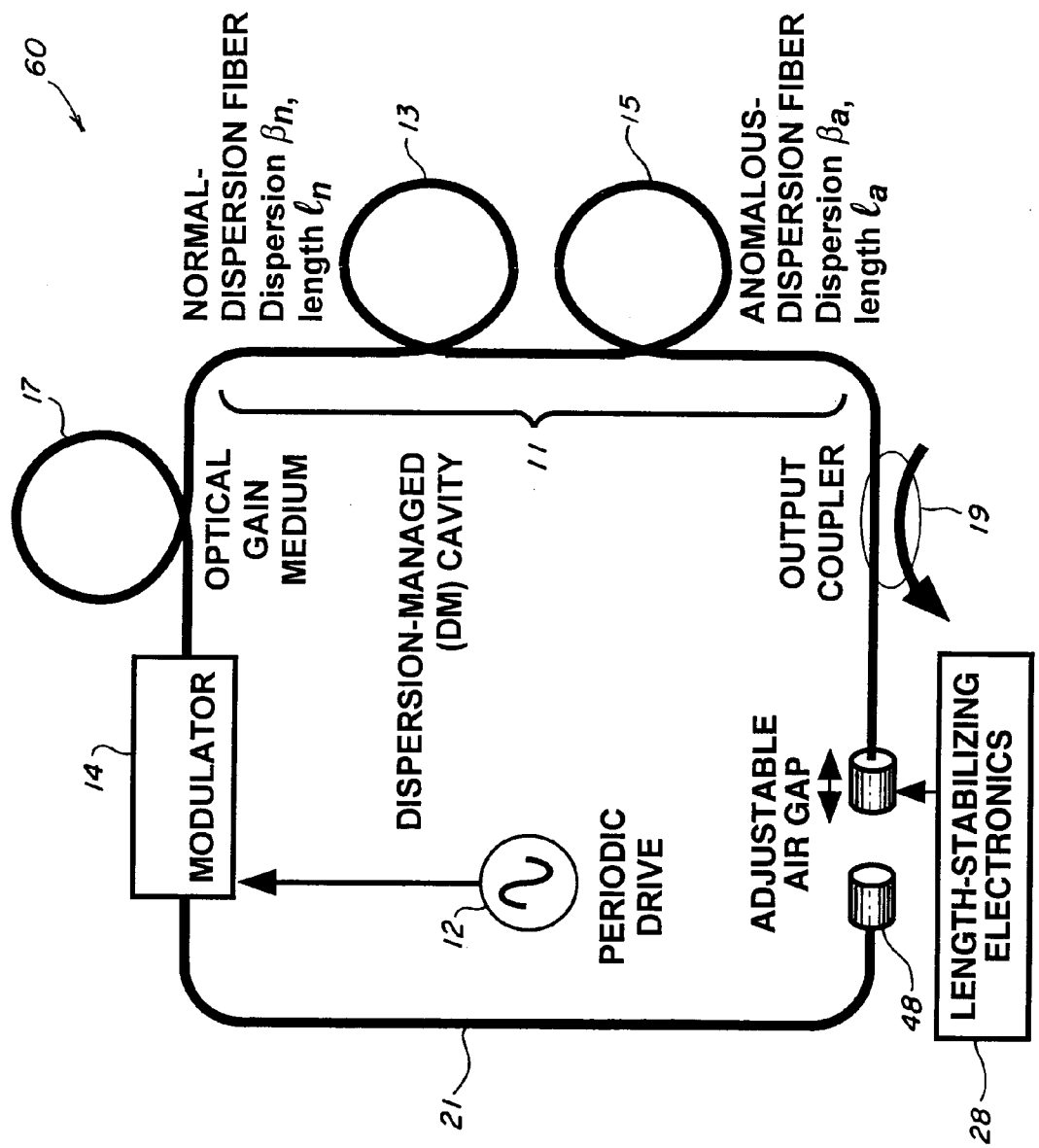
FIG. 1e shows a basic schematic of a dispersion-managed, actively mode-locked, all polarization-maintaining fiber laser containing a air gap-based length-stabilization system.

In another embodiment of a basic dispersion-managed, actively mode-locked, all polarization-maintaining fiber laser 60, as shown in FIG. 1e, the same optical circuit is utilized, as that shown in FIG. 1a, however an adjustable air gap 48 with length-stabilizing electronics 28 controls the length of the optical fiber laser cavity. Any or all of the components added to the laser cavity in FIGS. 1b, 1c, 1d, and 1e may be combined in a single laser.

Figure 2A:
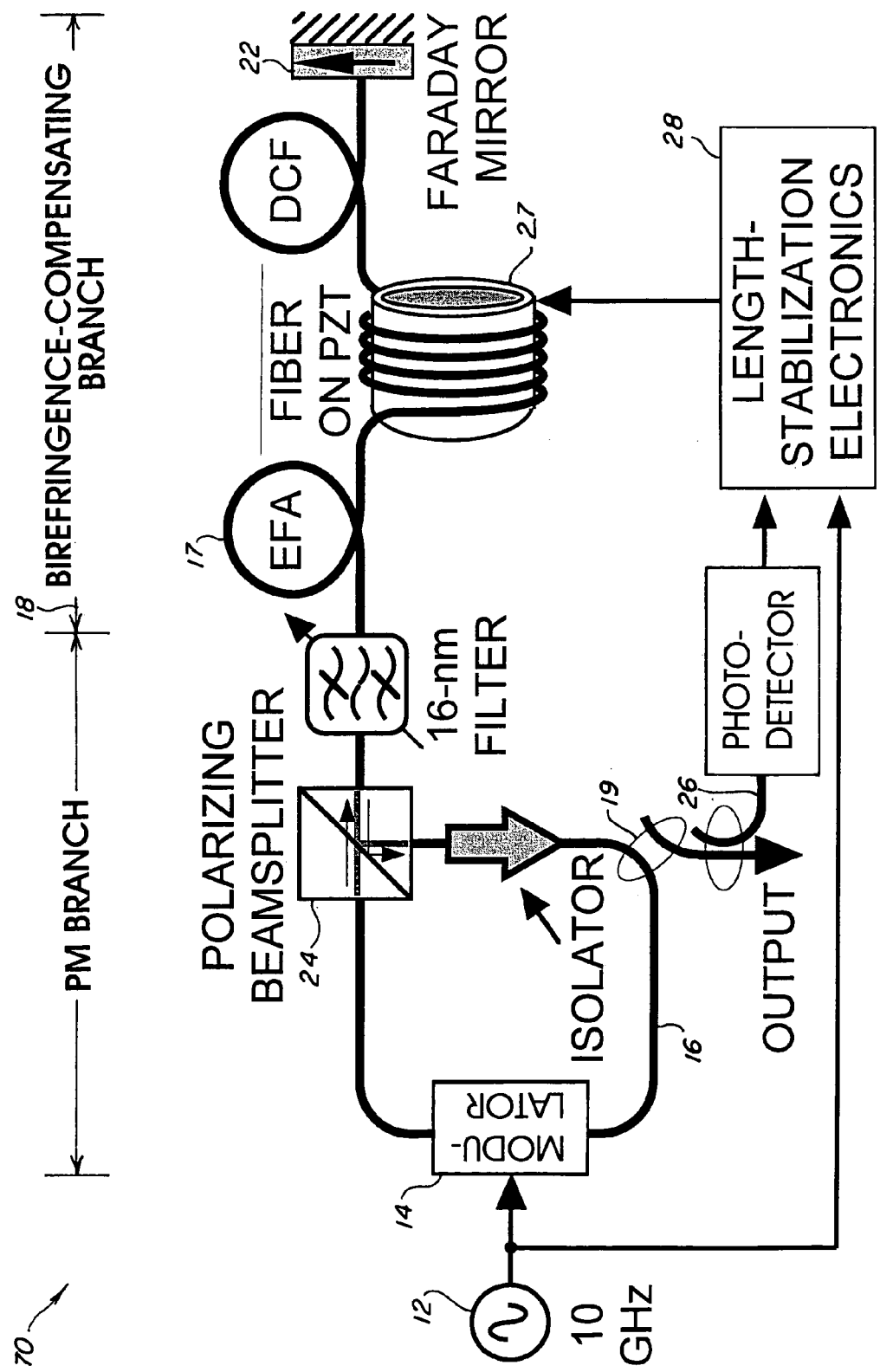
FIG. 2a shows an ultrashort-pulse dispersion-managed soliton sigma fiber laser with the optical modulator in the polarization-maintaining branch.

In a second preferred embodiment of the ultrashort-pulse fiber laser, as shown in FIG. 2a, the laser 70 is an actively mode-locked sigma laser, driven by an external frequency source, or master clock (synthesizer) 12 and actively length-stabilized. An optical modulator 14, such as a Mach-Zehnder modulator, is placed in a loop 21 of polarization-maintaining (PM) fiber forming a polarization-maintaining loop. To ensure unidirectional operation, an optical isolator 23 is contained within the laser cavity. The polarization state of light injected into the birefringence-compensating section or banch 18 evolves in a random manner but is transformed into an orthogonal state by a Faraday mirror 22; linearly polarized light injected into the birefringent-compensating branch 18 by the polarizing beamsplitter 24 returns to the beamsplitter 24 also linearly polarized but rotated by 90°. An optical circulator may be used in place of a polarizing beamsplitter 24 if so desired. An optical gain medium within the laser cavity amplifies the intensity of light circulating in the cavity. The linearly polarized light injected into the birefringence-compensating branch 18 passes through a section of optical fiber wrapped around a piezo electric cylinder 27 forming a laser cavity whose length is controlled by the application of an electrical signal from length-stabilization electronics 28. The means for controlling the length of the laser cavity may also be through the use of an adjustable air gap.

Figure 2B:
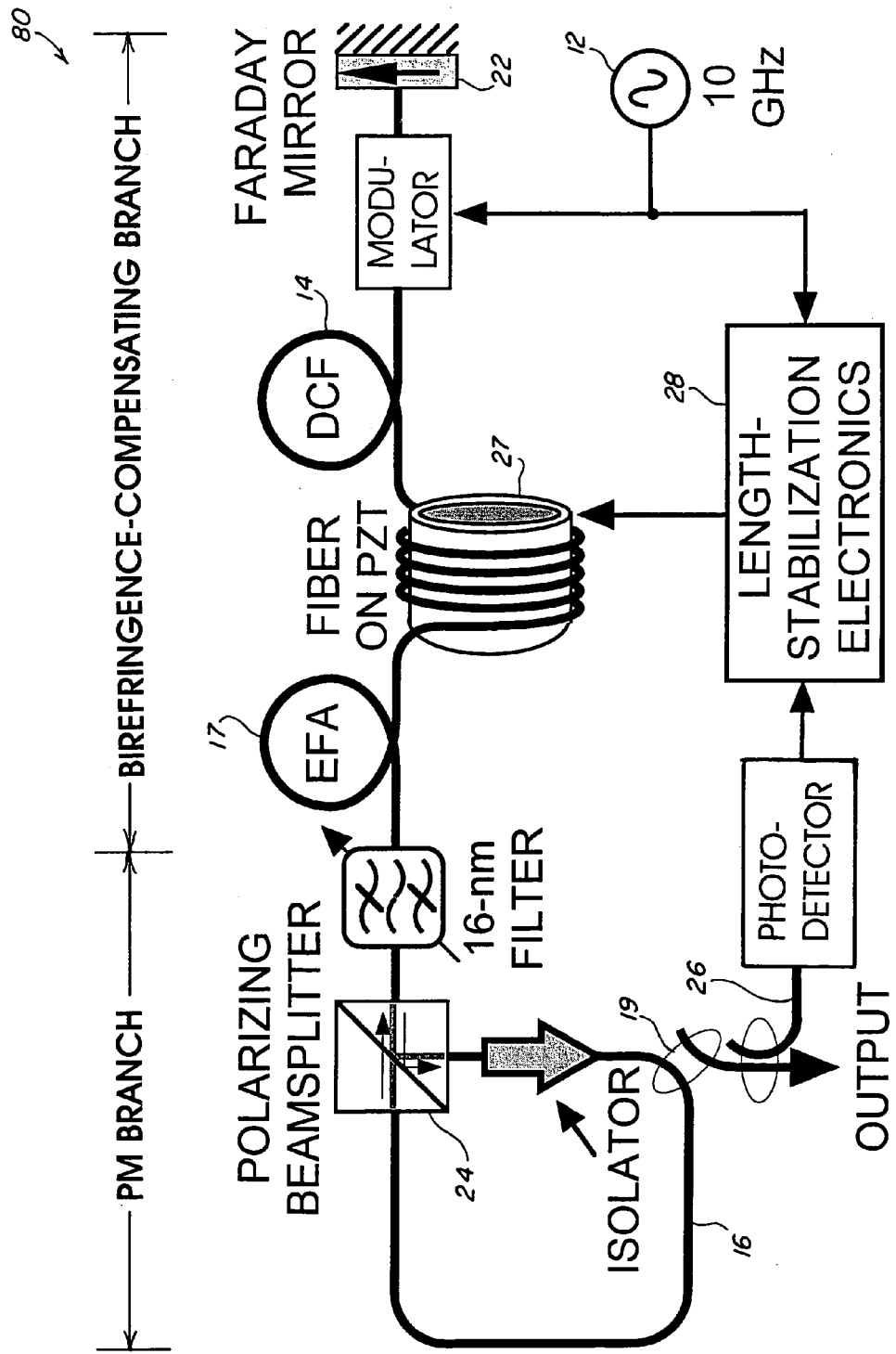
FIG. 2b shows an ultrashort-pulse dispersion-managed soliton sigma fiber laser with the optical modulator in the birefringence-compensating branch.

In another preferred embodiment 80, FIG. 2b, the optical modulator 14 may be placed elsewhere in the cavity, such as in the birefringent-compensating branch 18, adjacent to the Faraday mirror 22. The modulator 14 should be very close to the end of the birefringent-compensating branch 18 or at a position where counterpropagating pulses overlap since it must be "open" both for incident and returning light.

The cavity of the laser 70 is composed of several fibers, which types, lengths, and locations are set forth in Table 1. The average dispersion $D_{av}$ is anomalous and is approximately equal to 0.1 ps/(nm·km); the total cavity is typically ~195 m.

The lasers 70, 80, and 90 are mode-locked at a repetition rate of, preferably, 10 GHz, by driving the modulator 14 with an external periodic drive 12 at 10 GHz which is an integral multiple of the fundamental cavity frequency. Within the laser cavity there are approximately 10,000 pulses circulating and it is usually difficult to attain a uniform stream of uninterrupted pulses in an actively mode-locked laser with such a high harmonic order.

Figure 2C:
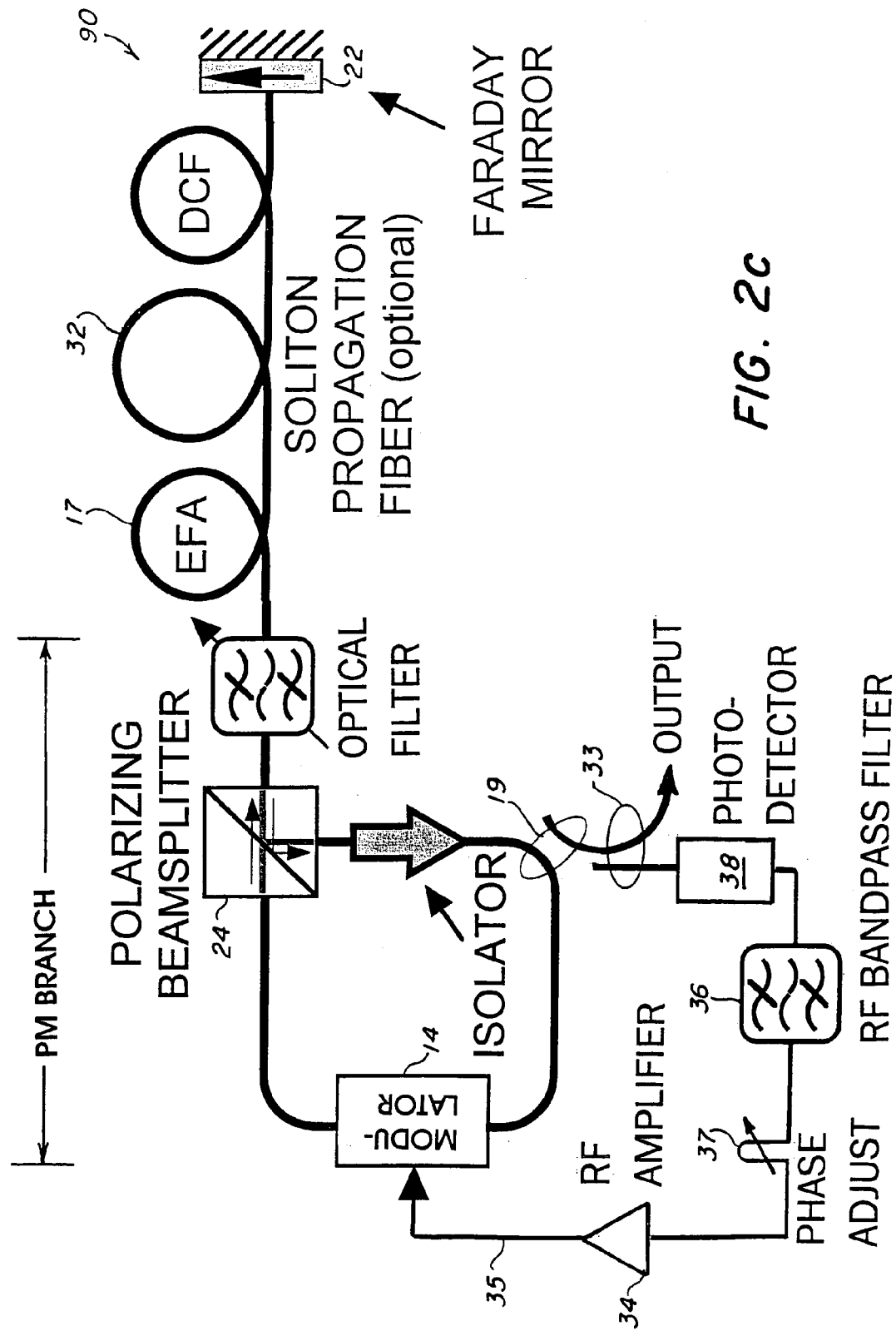
FIG. 2c shows a regeneratively-locked laser without length-stabilization.

In another preferred embodiment 90 as shown on FIG. 2c, a regenerative mode-locked device us shown. An optional soliton propagation fiber 32 is placed in the optical circuit prior to the Faraday mirror 22. The optical signal is modulated in a modulator 14 with an electrical signal that is the product of a regenerative cycle. The regenerative cycle is comprised of removing an optical signal from the loop by the use of a pair of optical couplers 19 and 33, converting the optical signal to an electrical signal in a photodetector 38, removing any unwanted frequencies in a bandpass filter 36, adjusting the phase 37, amplifying the phase adjusted electrical signal, amplifying it and applying it to the optical signal in the loop in a modulator 14.

Figure 2D:
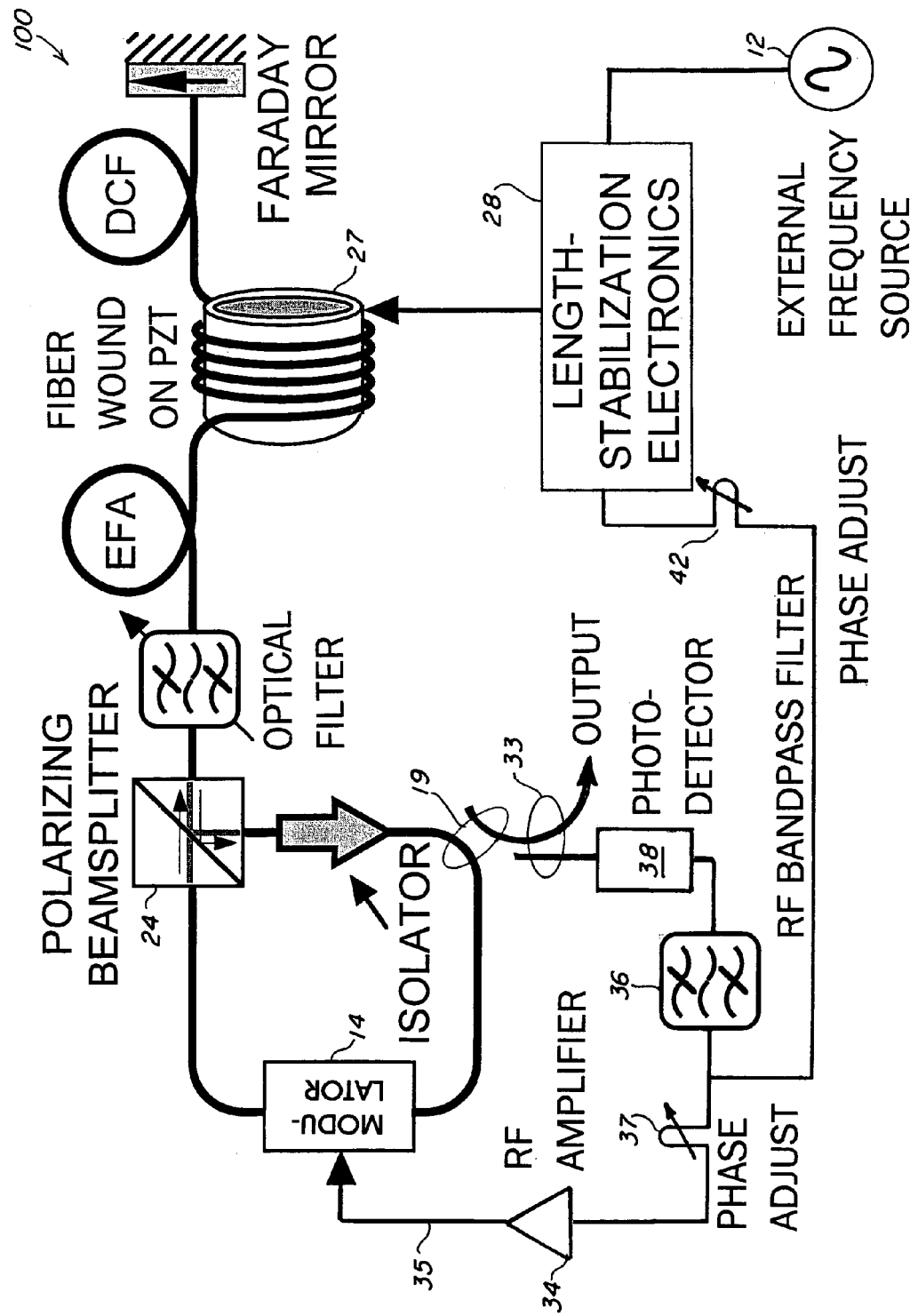
Figure 3A:
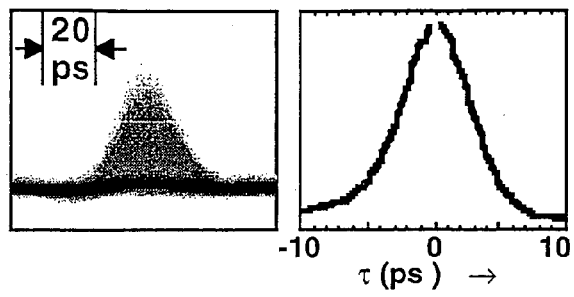
FIG. 3a shows an infinite-persistence oscilloscope trace of the lowest optical powers of the detected optical pulses of a duration of ~5 ps on the left and an autocorrelation trace on the right the three regimes of operation as the amount of energy per pulse is varied.
Figure 3B:
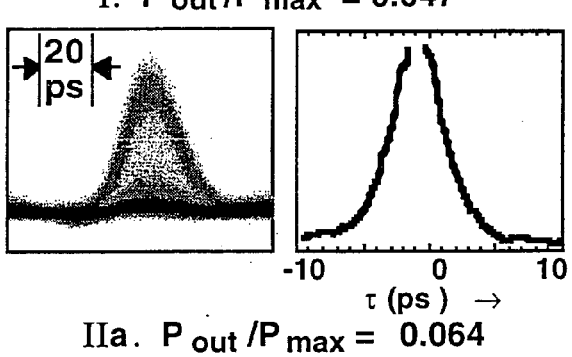
FIG. 3b shows an infinite-persistence oscilloscope trace of the lowest boundary of Regime II, showing the pulse dropouts whose number decreases from lower to higher powers, and pulse durations between 2.6 and 3.3 ps.
Figure 3C:
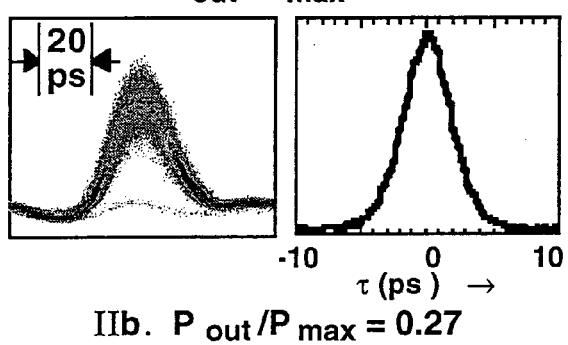
FIG. 3c shows an infinite-persistence oscilloscope trace of the upper boundary of regime II, showing the pulse dropouts whose number decreases from lower to higher powers, and pulse durations between 2.6 and 3.3 ps.
Figure 3D:
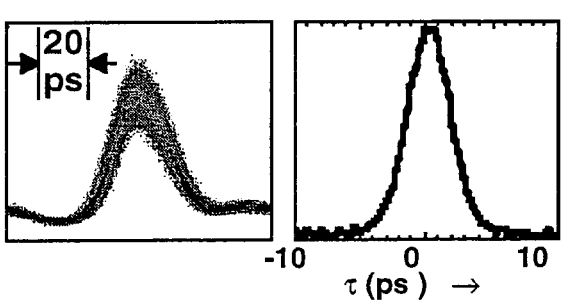
FIG. 3d shows an infinite-persistence oscilloscope trace of the lower boundary of regime III, showing filled pulse trains and pulse durations between 1.4 and 3.3 ps.
Figure 3E:
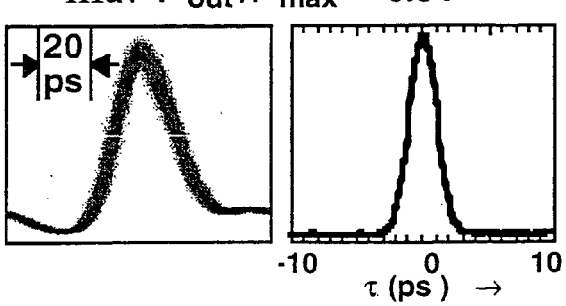
FIG. 3e shows an infinite-persistence oscilloscope trace of the highest experimental power, showing filled pulse trains and a pulse duration of 1.4 ps.

In another preferred embodiment 100, as shown on FIG. 2d, a regnerative mode-locked device with length-stabilization is shown. The optical signal is modulated by a regenerative electrical signal similar to that shown in FIG. 2c, however, a electrical signal from after a bandpass filter 36 is applied after phase adjustment 42 to the length stabilization electronic circuit 28 to control an optically wound PZT cylinders 27 diameter, similar to that described for FIG. 2a.

The lasers 70, 80, 90, and 100 exhibit a measured pulse dropout rates below $10^{-14}$. The measured noise in the output 26 of the lasers 70, 80, 90, and 100 are also very low: the rms amplitude noise is less than 0.035% and the rms timing jitter is less than 10 femtoseconds over a frequency range of 100 Hz to 1 MHz.

In the subject invention, three regimes are predicted, See FIGS. 3a through 3e, and show long-duration sampling oscilloscope pulse traces, on the left, paired with the pulse autocorrelation, on the right, for a series of average pulse powers expressed as a fraction of the maximum pulse power $P_{max}$. The Roman numerals signify the three observed regimes of operation of the laser. The highest energy regime cannot be obtained with the optical amplifier powers available, however, modeling shows that stable operation may be obtained over a range of pulse energies of at least a factor of three.

TABLE 1

| Fiber Type | Location | Length (m) | Dispersion D (ps/[nm · km])* |
|---|---|---|---|
| Polarization-maintaining (PM) | PM Loop | 15 | ~17 |
| SMF-28 | Birefringence-compensating branch | 10† | ~17 |
| Dispersion-shifted (DSF) | " | 55† | ~10 |
| Dispersion-compensating (DCF) | " | 15† | −65 |
| Gain fiber (EFA) | " | 10† | ~8 |

It is evident in FIGS. 3a through 3e that the amplitude noise of the laser output decreases as the pulse energy is increased; the same is true for the timing jitter. The decrease in noise levels as pulse energy is increased is also a consequence of dispersion-management: a dispersion-managed soliton has a higher energy than an equivalent uniform-dispersion soliton, and the noise-inducing effects of amplified spontaneous emission in the fiber amplifier are therefore minimized.

Figure 4:
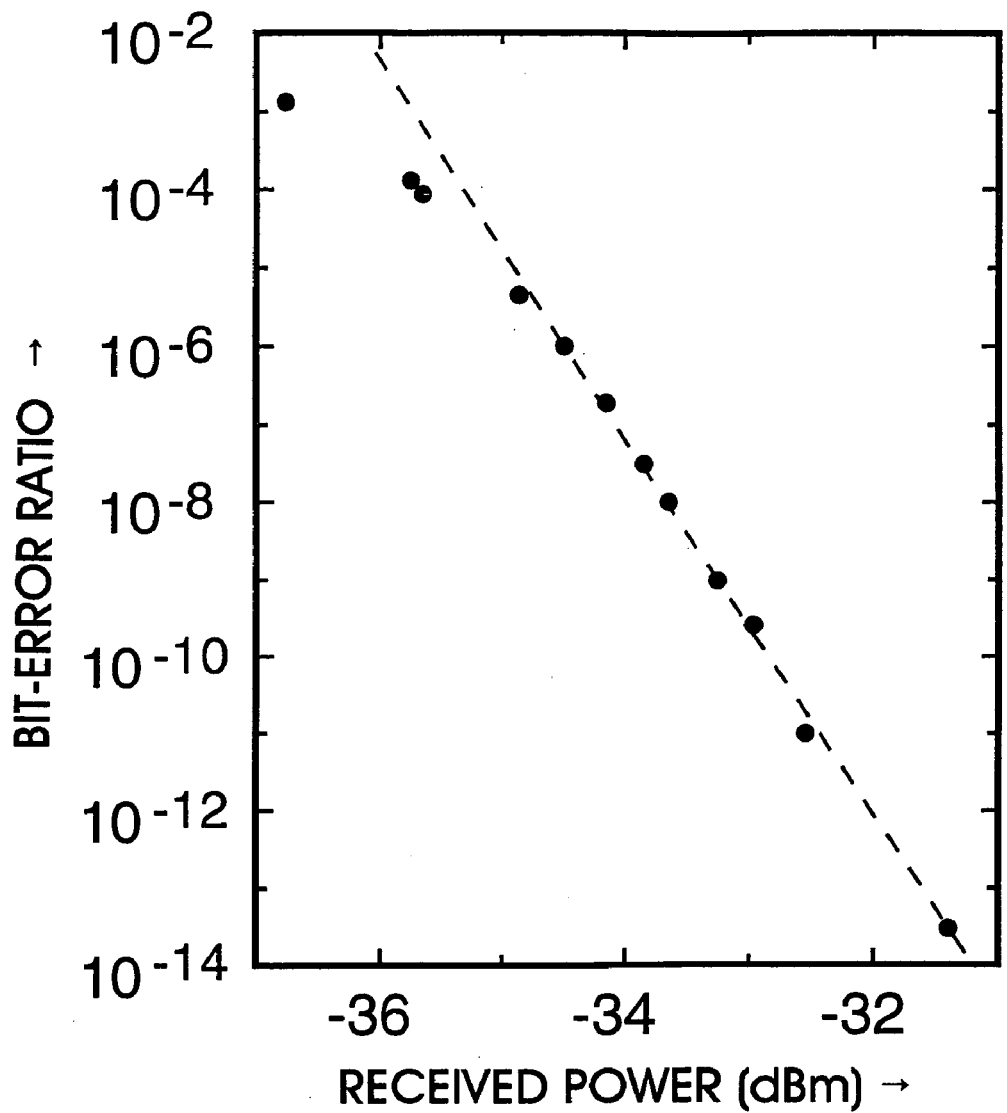
FIG. 4 shows a plot of the bit-error rate in a data transmission experiment using the dispersion-managed soliton sigma laser.

FIG. 4 is a plot of the bit-error rate in a data transmission experiment using the dispersion-management soliton sigma laser, demonstrating that its pulse dropout ratio is as low as $10^{-14}$. These back-to-back bit-error ratio measurements were made at 10 Gb/s using the solitan sigma laser as a source.

Figure 5A:
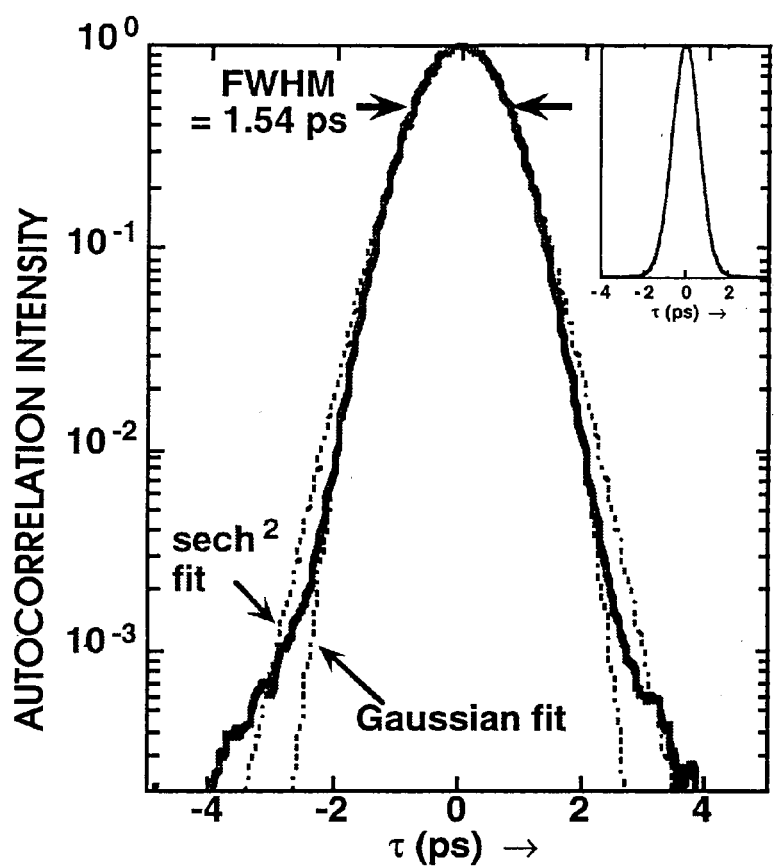
FIG. 5a shows the temporal characteristics of the output pulses.
Figure 5B:
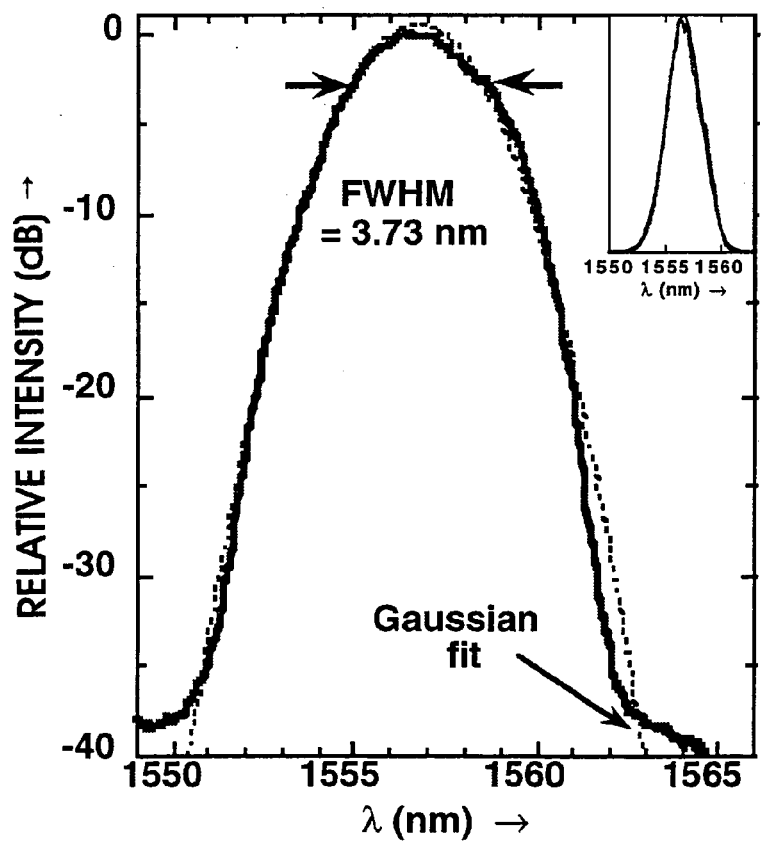
FIG. 5b shows the spectral characteristics of the output pulses.

FIGS. 5a and 5b show the temporal and spectral characteristics of the output pulses; pulse duration is 1.1 picoseconds generated with the dispersion-managed soliton laser, the autocorrelation, on the left, and optical spectrum, on the right. The pulse is approximately Gaussian in temporal shape.

A dispersion-managed soliton laser exhibits a greater immunity to pulse dropouts than an equivalent uniform-dispersion soliton laser and exhibits lower amplitude noise and timing jitter. Also, a dispersion-managed soliton fiber laser can produce pulses with adjustable temporal and spectral intensity profiles and durations to suit particular applications.

The critical factor in the dispersion-managed soliton fiber laser is the existence of a dispersion map in the laser cavity; other construction details of the laser may vary.

(i) A passively mode-locked dispersion-managed laser should exhibit superior characteristics to an equivalent uniform-managed soliton laser—its amplitude noise and timing jitter should be lower.

(ii) An actively mode-locked laser can be either amplitude- or phase-modulated using any of a number of modulator types.

(iii) An actively mode-locked laser can be mode locked by an external frequency standard and length-stabilized by a number of means, such as electronic circuits; such stabilization techniques are well known to those skilled in the art.

(iv) An actively mode-locked laser can be regeneratively mode-locked.

(v) A dispersion-managed laser can have more or all types of its fibers compose of PM fiber, so that fewer fibers need be placed in the birefringence-compensating branch; if all fiber types are polarization-maintaining, the birefringence-compensating branch is not needed.

Figure 6A:
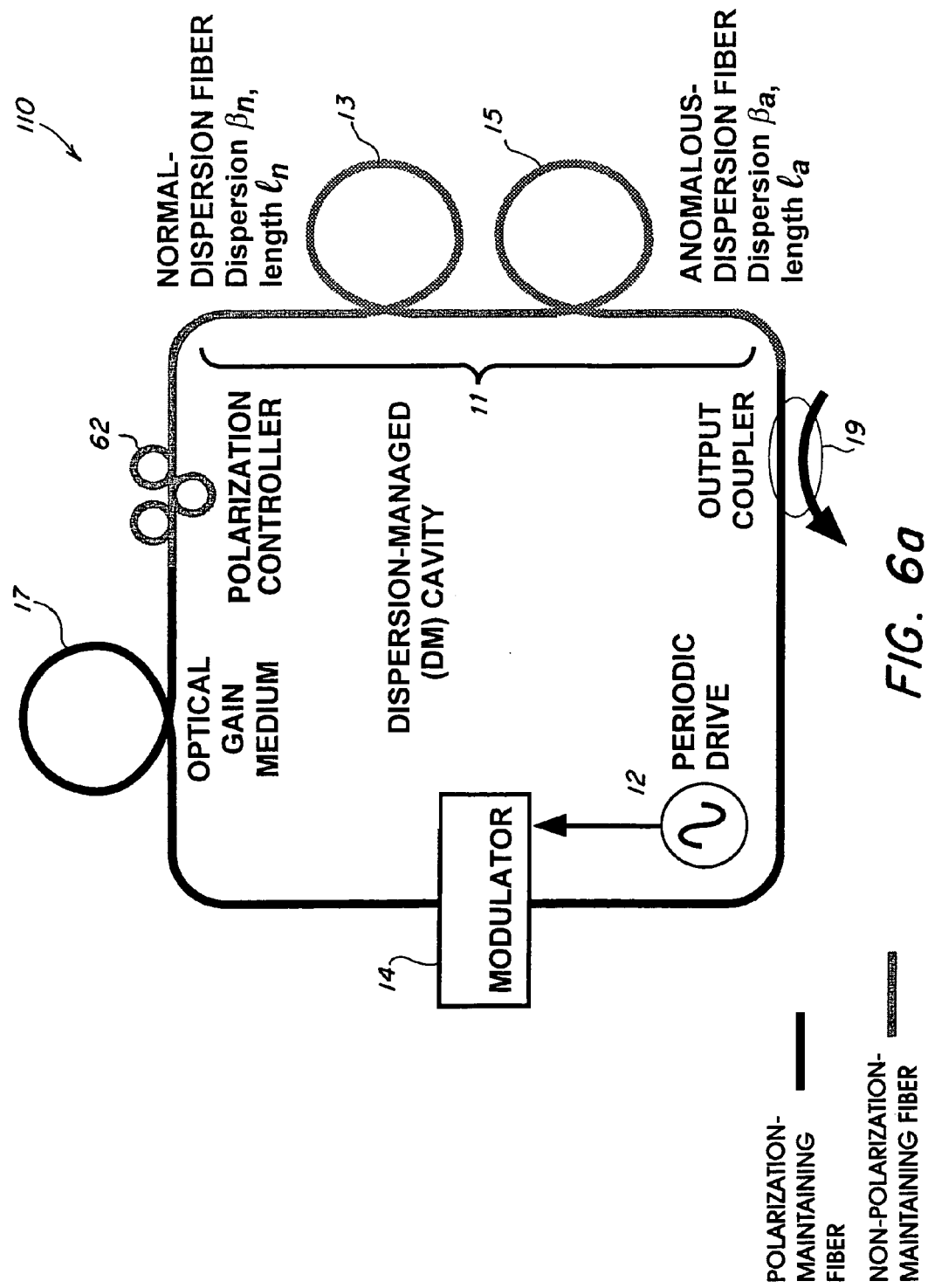
FIG. 6a shows a basic dispersion-managed, actively mode-locked, partially polarization-maintaining fiber, partially non-polarization-maintaining fiber laser with a polarization controller.
Figure 6B:
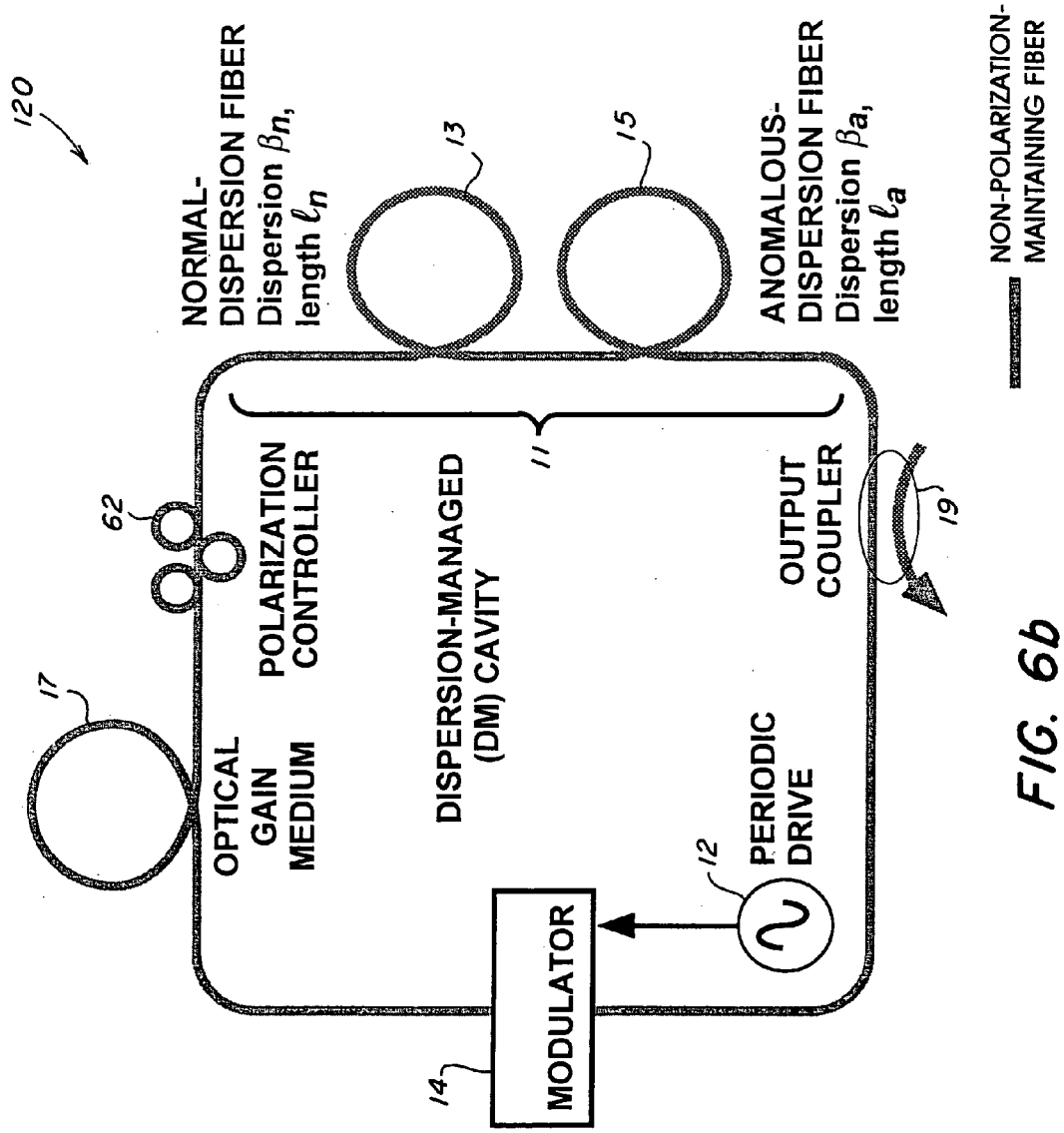
FIG. 6b shows a basic dispersion-managed, actively mode-locked, non-polarization-maintaining fiber laser wwith a polarization controller.
Figure 6C:
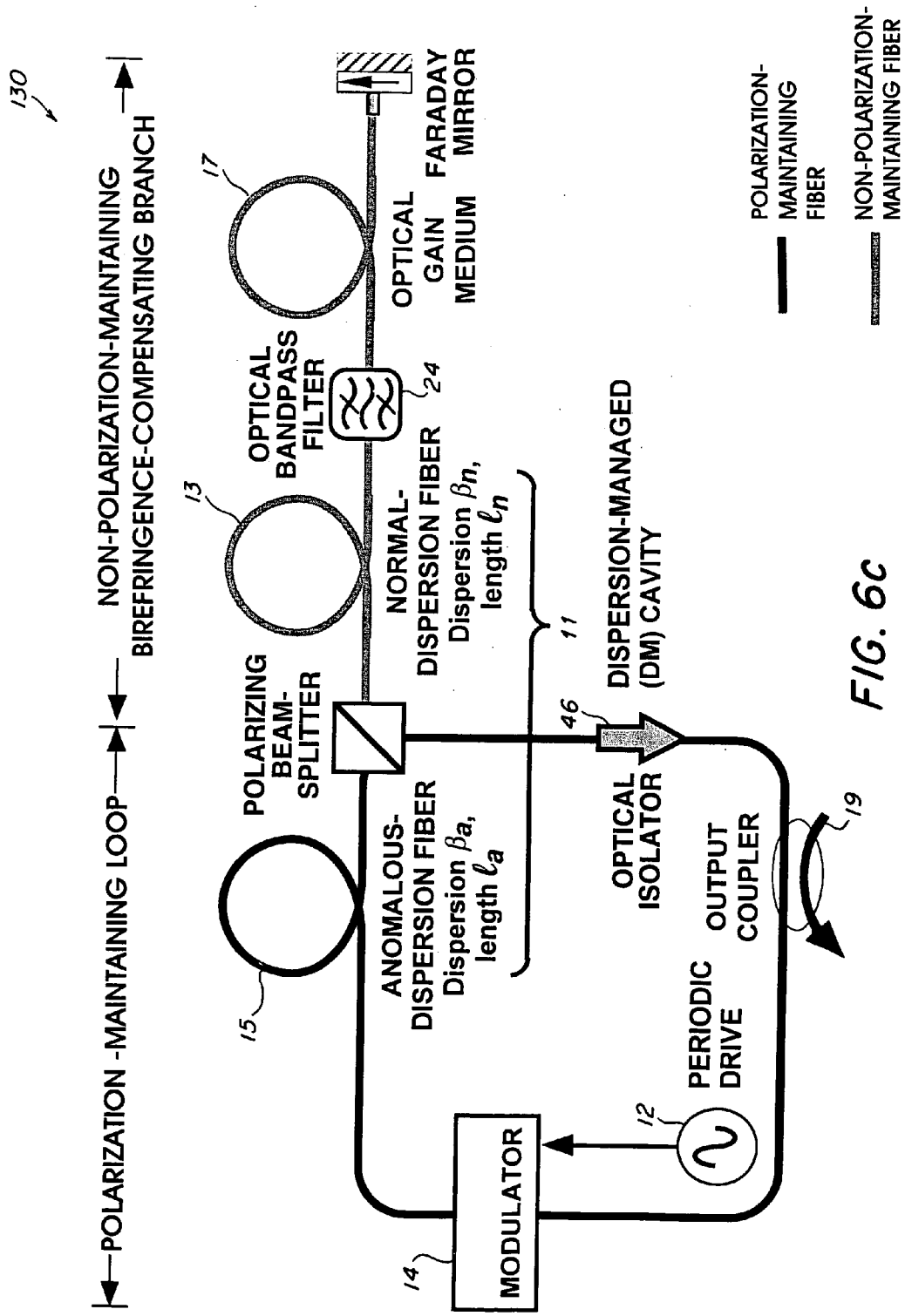
FIG. 6c shows a basic dispersion-managed, actively mode-locked, partially polarization-maintaining, partially non-polarization-maintaining fiber laser containing an optical isolator, a birefringence-compensating branch, a polarizing beamsplitter, an optical bandpass filter, and a Faraday mirror. A laser with this configuration is known as a Sigma laser.

(vi) Although it is preferred if the dispeersion-managed laser cavity be partially polarization-maintaining and birefringent-compensating, as in FIGS. 2a and 2b, it may also be partialy polarization-maintaining and partially non-polarization-maintaining, as shown in FIGS. 6a and 6c, non-polarization-maintaining, as shown in FIG. 6b, or totally polarization-maintaining, as shown in FIG. 1a.

(vii) A dispersion-managed laser can have several of its component fibers serving more than one purpose. For instance, the optical gain fiber might be designed to have a large normal dispersion, eliminating the need for a separate dispersion-compensating fiber.

(viii) Normal-dispersion fiber might not be necessary in a dispersion-managed laser. Component fibers that possess anomalous dispersion but of differing magnitudes may be used and some or all of the advantages of dispersion management may be retained.

(ix) Dispersion of either sign need not be provided by lengths of fiber. For instance, fiber Bragg gratings can add either type of dispersion to the laser cavity; so can fiber-integrated diffraction gratings, prisms, photonic bandgap materials, or bulk dispersive material.

(x) For ensuring that the periodic drive is an integral multiple of the fundamental frequency a fiber-wound PZT cylinder is preferred, however, an air gap may be used, as shown in FIG. 1e. Or, the frequency of the periodic drive may be varied to match the integral multiple fundamental cavity frequency by the use of a voltage controlled oscillator or regenerative locking, as in FIGS. 2c and 2d.

(xi) The modulator may be an optical modulator, such as a Mach-Zehnder modulator, wherein it is modulated with an electrical signal, or it may be of another type, such as a light-by-light modulator wherein the optical signal is modulated by another optical signal.

(xii) A polarization controller 62 may be used, as in FIGS. 6a and 6b to control the polarization state of the optical signal.

This above-described invention differ from what is taught in the Statutory Invention Registration (SIR) by Carruthers et al., entitled PICOSECOND-TO-FEMTOSECOND ERBUIM FIBER LASER, Ser. No. 08/825,942, filed on Apr. 1, 1997; in that the dispersion map has close to optimum strength so that the average dispersion is much closer to zero than that taught in the SIR. The device taught in the SIR does not have a dispersion map per se; the purpose of the dispersion-compensating fiber in the SIR is merely to reduce the average dispersion of the laser to a manageable level.

Although the invention has been described in relation to an exemplary embodiment thereof, it will be understood by those skilled in the art that still other variations and modifications can be affected in the preferred embodiment without detracting from the scope and spirit of the invention as described in the claims, as can be seen in the various figures.

What is claimed is:

1. An ultrashort-pulse laser comprising: a dispersion-managed cavity having fibers which control and change the duration and bandwidth of an optical pulse as it propagates within the cavity driven by an external source and actively length stabilized, said dispersion managed cavity also including: a first branch of polarization-maintaining (PM) optical fiber forming a first loop; an optical modulator in optical communication with said fibers; a second branch of non-polarization maintaining optical fiber forming a birefringence-compensating section and connected to said first branch by a polarizing beamsplitter, said non-polarization-maintaining optical fiber wound onto a piezoelectric cylinder for controlling the length of the optical fiber, and a Faraday mirror for transforming light into an orthogonal state; the polarizing beamsplitter connected between said first branch and second branch for injecting linearly polarized optical energy into the second branch, said dispersion managed cavity increasing the signal-to-noise ratio of the propagating pulses and increasing the stability of the propagating pulses.

2. The ultrashort-pulse laser, as in claim 1, wherein said laser is a mode-locked laser.

3. The ultrashort-pulse laser, as in claim 1, wherein the length of the laser cavity is controlled by the optical fiber wrapped around the piezoelectric cylinder, the cylinder's diameter controlled by a voltage supplied by a length-stabilizing electronic circuit.

4. The ultrashort-pulse laser, as in claim 1, wherein the length of the laser cavity is controlled by a soliton propagation fiber.

5. The ultrashort-pulse laser, as in claim 1, wherein the length of the laser cavity is controlled by an adjustable air gap.

6. The ultrashort-pulse laser, as in claim 1, wherein the laser is an actively mode-locked sigma laser.

7. The ultrashort-pulse laser, as in claim 1, wherein the beamsplitter is an optical circulator.

8. The ultrashort-pulse laser, as in claim 1, wherein the optical modulator is disposed in the loop of polarization-maintaining optical fiber.

9. The ultrashort-pulse laser, as in claim 1, wherein the optical modulator is disposed in the birefringence-compensating section adjacent to the Faraday mirror.

10. The ultrashort-pulse laser, as in claim 1, further comprising a signal generator for driving the optical modulator, the signal generator being a synthesizer.

11. The ultrashort-pulse laser, as in claim 10, wherein the synthesizer is a master clock.

12. The ultrashort-pulse laser, as in claim 10, wherein the signal of said generator is a regenerative mode-locking signal.

13. The ultrashort-pulse laser, as in claim 12, wherein the regenerative mode-locking signal with signal stabilization controls the length of said laser cavity.

* * * * *